Nov. 22, 1960  J. G. ROGERS  2,960,914
ELECTRO-OPTICAL LIGHT SHUTTER
Filed Aug. 29, 1958
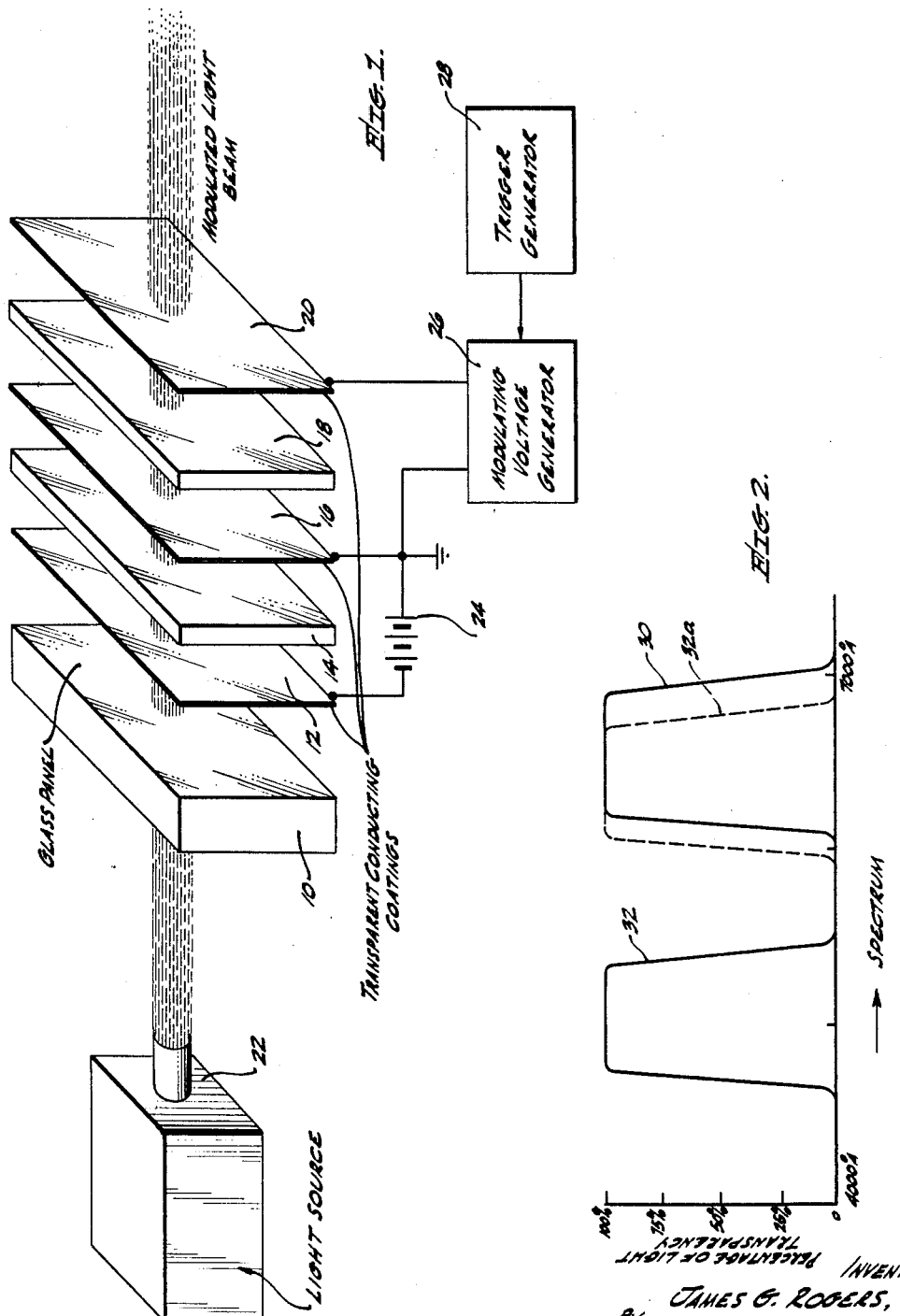

2,960,914
Patented Nov. 22, 1960

2,960,914
ELECTRO-OPTICAL LIGHT SHUTTER

James G. Rogers, Fullerton, Calif., assignor to Hughes Aircraft Company, Culver City, Calif., a corporation of Delaware Filed Aug. 29, 1958, Ser. No. 758,044

4 Claims. (Cl. 88—61)

This invention relates to a shutter capable of operating at sub-microsecond speeds and, more particularly, to apparatus adapted to transmit light within a predetermined portion of the spectrum for determinable intervals of time in response to low-amplitude electrical signals.

It is the present practice to obtain sub-microsecond exposures through the use of what is known as a "Kerr cell" or, alternatively, through the use of anisotropic single crystals. Both of the foregoing light shutters have been used successfully. The Kerr cell, however, has the disadvantage in that it requires extremely high voltages and extremely high power to operate and it is difficult if not impracticable to modulate the device in a linear manner. As a result, high energy pulse discharge techniques which utilize electrostatic or electromagnetic storage are commonly employed. Light shutters built about electrically-variable anisotropic cells, in addition, function by rotating the effective plane of polarization of the light transmitted through two crossed polarizers; in this manner, they modulate the beam according to a sine-quared function. Thus their nonlinearity accrues primarily from their mode of operation, rather than from their high voltage and power requirement, which is another technological problem.

It is therefore an object of the present invention to provide an improved shutter capable of operating at submicrosecond speeds.

Another object of the present invention is to provide apparatus capable of allowing selected portions of the light spectrum to pass therethrough for electronically determined intervals of time.

Still another object of the present invention is to provide an electronically operable low-power, low-voltage light shutter capable of video modulating a beam of light.

In accordance with the present invention first and second uniformly thick multilayer interference light filters are disposed adjacent to and coextensive with each other and have transparent conductive coatings disposed between and on both exposed sides thereof. The filters and conductive coatings are supported by a substrate provided, for example, by a thin glass pane. The light filters are of a type which transmit only a portion of the light spectrum and, in addition, are made of materials characterized by indexes of refraction which progressively increase or decrease in accordance with the intensity of a potential gradient applied thereacross. Thus, the effect of changing the potential gradient applied across one of the light filters is to shift the portion of the light spectrum transmitted by the filter. In operation, potentials are applied to the transparent conductive coatings in a manner to cause each filter to transmit different non-overlapping portions of the light spectrum whereby essentially no light is transmitted through both of the filters. Then, by means of voltages applied to one or more of the conductive coatings, the potential gradient across at least one of the light filters is changed in any manner to cause the portions of the light spectrum transmitted by the filters to coincide for a determinable interval of time thereby providing a light shutter. If the light beam to be modulated or controlled is initially monochromatic light or light that is of wavelengths throughout only a portion of the light spectrum, it is evident that only one of the above-mentioned light filters which initially transmits light within the remaining portion of the spectrum is necessary to provide a light shutter. Also, by progressively overlapping the portions transmitted by the light filters in accordance with the amplitude of a video signal, it is apparent that the intensity of the light beam will be modulated so long as the wavelengths of the light are distributed uniformly throughout the portion of the spectrum being used.

The above-mentioned and other features and objects of this invention and the manner of obtaining them will become more apparent by reference to the following description taken in conjunction with the accompanying drawings, wherein:

Fig. 1 illustrates an exploded perspective view of a preferred representation of the invention; and Fig. 2 illustrates characteristics of the light filters in the apparatus of Fig. 1.

Referring now to Fig. 1, the sub-microsecond shutter apparatus of the present invention comprises a substrate 10 provided by a thin glass pane which covers an area equal to or greater than that through which the passage of light is to be controlled. Then, in the order named, a first transparent conductive coating 12, a multilayer interference light filter 14, a second transparent conductive coating 16, a second multilayer interference light filter 18, and lastly, a third transparent conductive coating 20 are disposed over one side of the substrate 10. The transparent conductive coatings 12, 16 and 20 may be of the type provided by evaporating a thin coating of zinc oxide over a surface followed by sputtering gold or silver over the zinc oxide layer. Alternatively, the transparent conductive coating 12 that is in actual contact with the glass pane 10 may be produced by treating the glass in the conventional manner with stannous chloride. The minimum resistivity of a transparent coating of this type is of the order of 100 ohms per square; whereas the resistivity of the zinc oxide and sputtered gold or silver coating may be made as low as 4 ohms per square. Because of the comparatively large capacitance which inherently exists betwen adjacent conductive coatings 12, 16, 20, it may be desirable to keep the resistivity of the coatings less than 10 ohms per square in order to minimize distributed time constants over the surface of the shutter. The transparency of either type of transparent conductive coating may be made in excess of 95%.

The light filters 14, 18, as specified above, are made uniformly thick so that light, if transmitted at all, is transmitted uniformly through all portions of the entire filter. The filters are made of alternate layers of material having a low-index of refraction such as, for example cryolite, and layers of material having a high-index of refraction such as, for example, zinc sulfide. It is preferable but not necessary to place the layer having a high index of refraction both first and last in fabricating the light filters 14, 18. The indexes of refraction of zinc sulfide and cryolite are also determinable within a limited range by the potential gradient applied thereacross. This determinability of the indexes of refraction by the electric stress produced thereacross is of the type described by Schramm in an article entitled, "Electro-Optical Effect in ZnS" which appears in vol. 25, pg. 309 of Annalen der Physik, published February 1936 in Germany and in an article entitled "Piezo-optic and Electro-optic Properties of Zinc Blende (ZnS)," by R. Kara, P. Mathieu and H. Poulet in the Journal de Physique et le Radium published January 1954 in France. Both of the aforementioned characteristics, i.e. the uniformity of the transmission of light and the determinability of the indexes of refraction by electric stresses are essential for the proper operation of the device of the present invention. The thickness of a typical interference filter having eleven layers is of the order of 1.4 microns. Although the representative embodiment described above teaches the disposition of both of the light filters 14, 18 on a single substrate 10, it is obviously possible to use a separate substrate for each light filter.

In operation, a light source 22 provides a beam of light which is directed through the glass pane 10, transparent conductive coatings 12, 16, 20 and multilayer interference light filters 14, 18 thereby to be controlled or modulated. The source 22 may constitute a lens or a primary source such as a lamp. A potential gradient is impressed across the light filter 14 by means of suitable connections from respective terminals of a battery 24 to the transparent conductive coatings 12, 16. Because of the considerable capacitance which may exist between the conductive coatings 12, 16, 20, the conductive coating 16, which separates the light filters 14, 18, is maintained at a substantially fixed potential such as, for example, ground by means of an appropriate connection thereto. The quiescent direct-current potential gradient produced across the light filter 14 determines the location of the portion of the light spectrum which is transmitted therethrough. Referring to Fig. 2, this portion of the spectrum may be represented, for example, by the transmission characteristic 30.

A potential gradient is also applied across the remaining light filter 18 by the connection of an output lead from a modulating voltage generator 26 to the transparent conductive coating 20, the voltage output from the generator 26 being referenced to ground by connecting the remaining output lead therefrom to ground. Modulating voltage generator 26 normally produces a direct-current quiescent voltage which determines the initial location of the portion of the light spectrum which is transmitted through the light filter 18. As illustrated in Fig. 2, the portion of the light spectrum that is transmitted by light filter 18 is represented by the transmission characteristic 32. In accordance with the normal mode of operation of the device of the present invention, the transmission characteristic 32 will not overlap with the transmission characteristic 30 under quiescent conditions. In response to a trigger generator 28, however, the output voltage produced by modulating voltage generator 26 changes. This change may either be in the form of a step voltage in which case the transmission characteristic 32 would be shifted over so as to coincide with the transmission characteristic 30 of light filter 14. A dashed line 32a, illustrated in Fig. 2, represents the transmission characteristic 32 in the process of being shifted over so as to coincide with the transmission characteristic 30. The aforementioned change in output potential of generator 26 is maintained for the period of time during which it is desired to maintain the shutter open. It is to be noted that the initial place of the transmission characteristic 30 within the spectrum may be selected so as to allow predominantly blue, green, red or other color light to pass through the shutter. This color may, of course, be changed between successive openings of the shutter by merely applying appropriate direct-current potentials to the transparent conductive coatings 12, 16 disposed on opposite sides of the light filter 14.

An alternative mode of operation would be to sweep the transmission characteristic 32 across the transmission characteristic 30 by applying, for example, a sweep voltage to the transparent conductive coating 20. In this case the transmission characteristics 30, 32 may either each be shifted towards the other or, as illustrated in the figure, the transmission characteristic 32 may be shifted across the transmission characteristic 30 which remains stationary. In this mode of operation the modulating voltage generator 26 develops a sweep voltage which commences in response to the trigger signal from trigger generator 28. In general, the maximum voltages which need to be applied to the transparent conductive coatings 12, 16, 20 are less than 100 volts in amplitude.

Alternatively, light from light source 22 may be video modulated by providing a video signal with modulating voltage generator 26 whereby the transmission characteristic 32 overlaps the transmission characteristic 30 in proportion to the amplitude thereof. In this case, the video signal would be limited to a predetermined amplitude where there would be maximum overlap of transmission characteristics 30, 32.

What is claimed is:

1. An optical apparatus comprising a multilayer interference light filter for transmitting a first discrete range of wavelengths within the light spectrum, said filter having first and second sides and an index of refraction determinable by the potential gradient applied thereacross; first and second transparent conductive coatings disposed adjacent to and coextensive with said first and second sides of said light filter, respectively; means for uniformly illuminating one side of said light filter with light having a second discrete range of wavelengths within the light spectrum; and means connected to said first and second transparent conductive coatings for producing a potential gradient of predetermined characteristics across said light filter to change said index of refraction and thereby to shift said first discrete range of wavelengths and thereby determine the extent that said first and second discrete ranges of wavelengths overlap.

2. An optical apparatus comprising first and second multilayer interference light filters adapted to transmit first and second discrete ranges of wavelengths within the light spectrum, respectively, said first and second light filters being of uniform thicknesses and having first and second indexes of refraction determinable by the potential gradient applied thereacross thereby to determine the relative placement of said first and second discrete ranges of wavelengths within the light spectrum; means for producing first and second potential gradients across said first and second light filters, respectively, thereby to cause said first and second discrete ranges of wavelengths to occupy non-overlapping intervals of the light spectrum; and means for changing at least one of said potential gradients to change the respective index of refraction and thereby shift the position of at least one of said discrete ranges of wavelengths towards the remaining discrete range of wavelengths to the extent that said first discrete range overlaps said second discrete range for a controllable period of time thereby allowing light to be transmitted through said first and second filters within the interval of the spectrum that is common to both said first and second discrete ranges of wavelengths.

3. An optical apparatus comprising a transparent substratum for providing a support surface; a first transparent conductive coating disposed immediately adjacent to and coextensive with said support surface; a first uniformly thick multilayer interference light filter for transmitting only a first discrete range of wavelengths within the light spectrum having one side disposed immediately adjacent to said first transparent conductive coating, said first light filter having a first index of refraction determinable by the potential gradient applied thereacross; a second transparent conductive coating disposed immediately adjacent to and coextensive with the remaining side of said first light filter; a second uniformly thick multilayer interference light filter for transmitting only a second discrete range of wavelengths within the light spectrum having one side disposed immediately adjacent to and coextensive with said second transparent conductive coating; a third transparent conductive coating disposed immediately adjacent to and coextensive with the remaining side of said second light filter; means connected to said first, second and third transparent conductive coatings for producing first and second potential gradients across said first and second light filters, respectively, to change said first and second indexes of refraction and thereby to cause said first and second discrete ranges to occupy non-overlapping intervals of the light spectrum; and means for changing at least one of said first and second potential gradients to change the respective index of refraction and thereby shift the position of at least one of said first and second discrete ranges of wavelength toward the remaining discrete range of wavelengths to the extent that said first range overlaps said second range for a controllable period of time thereby allowing light to be transmitted through said first and second filters within the interval of the spectrum that is common to both said first and second discrete ranges of wavelengths.

4. The optical apparatus as defined in claim 3 wherein the resistivity of said first, second and third transparent conductive coatings is no more than 10 ohms per square centimeter.

References Cited in the file of this patent
UNITED STATES PATENTS

| | | |
|---|---|---|
| 2,600,962 | Billings | June 17, 1952 |
| 2,804,803 | Edwards et al. | Sept. 3, 1957 |